United States Patent [19]
Bland et al.

[11] 3,987,687
[45] Oct. 26, 1976

[54] ADJUSTABLE TORQUE FRICTION CLUTCH

[75] Inventors: James R. Bland, Montgomery; Fred R. Dauwalder, Aurora, both of Ill.

[73] Assignee: Caterpillar Tractor Co., Peoria, Ill.

[22] Filed: Apr. 30, 1975

[21] Appl. No.: 573,219

Related U.S. Application Data

[63] Continuation of Ser. No. 407,633, Oct. 18, 1973, abandoned.

[52] U.S. Cl. .................................. 74/531; 74/519
[51] Int. Cl.² ............................................ G05G 5/06
[58] Field of Search .............. 74/527, 531, 519, 504

[56] References Cited
UNITED STATES PATENTS

| | | |
|---|---|---|
| 2,401,741 | 6/1946 | Korodi et al. .......................... 74/531 |
| 2,749,825 | 6/1956 | Hirasuna .......................... 74/531 X |
| 3,439,557 | 4/1969 | Bookout .............................. 74/531 |

*Primary Examiner*—Samuel Scott
*Assistant Examiner*—Frank H. McKenzie, Jr.
*Attorney, Agent, or Firm*—Phillips, Moore, Weissenberger, Lempio & Strabala

[57] ABSTRACT

A control lever arm pivotably mounted on a shaft has associated therewith a plurality of friction discs, and washers disposed between alternate adjacent friction discs. Means are included for adjusting the tightness of the friction discs and washers, such adjustment thereby varying the force which must be applied to the lever arm to overcome the force of such friction discs and pivot the arm about the shaft.

1 Claim, 3 Drawing Figures

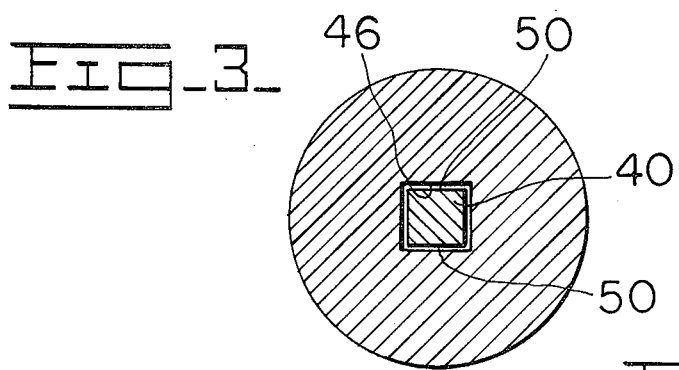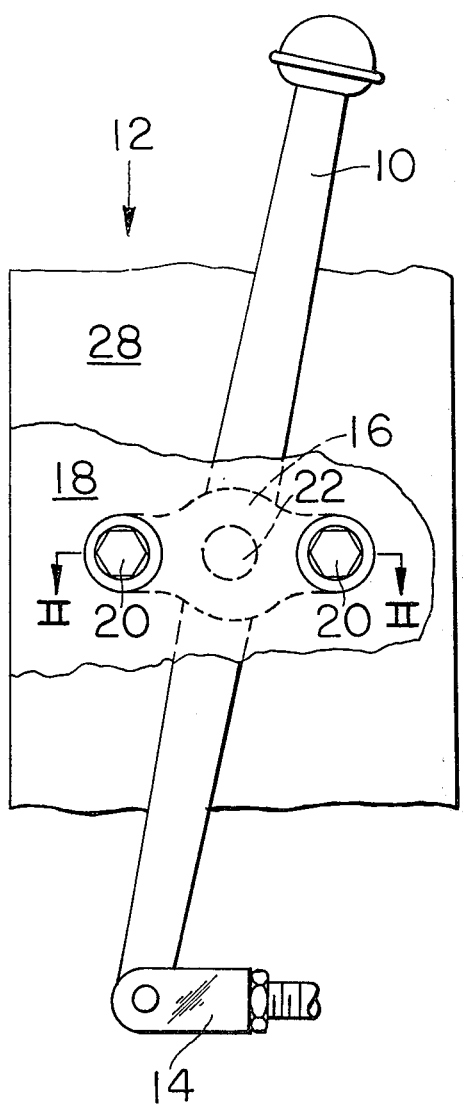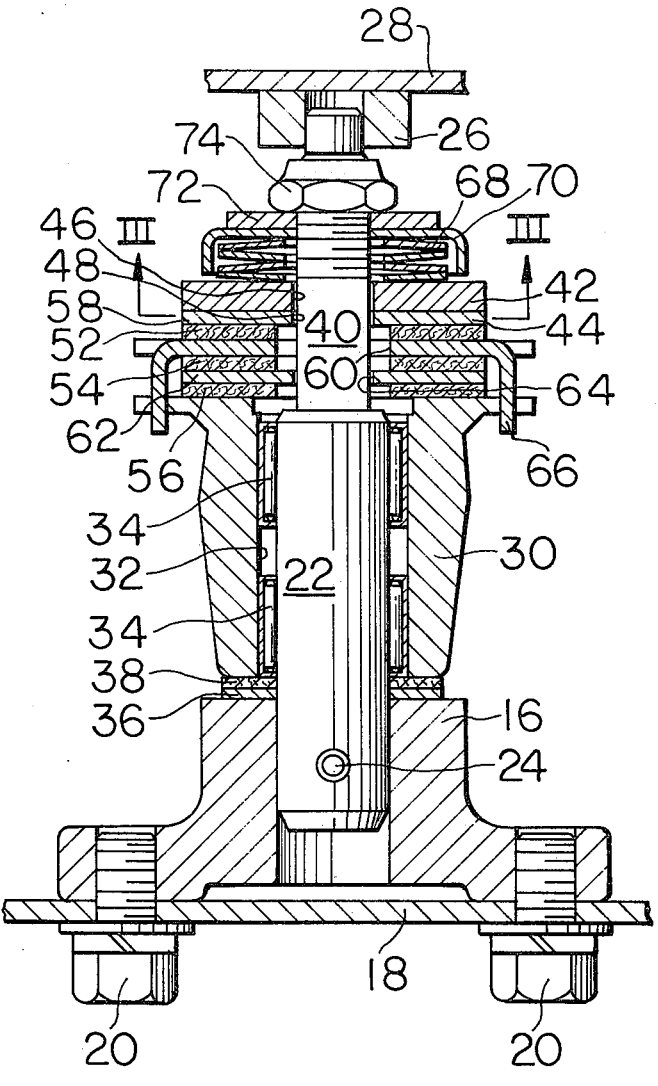

ADJUSTABLE TORQUE FRICTION CLUTCH

This is a continuation of Ser. No. 407,633, filed Oct. 18, 1973, now abandoned.

BACKGROUND OF THE INVENTION

This invention relates to a lever mounting, and more particularly to a means for providing a variable friction device wherein a control lever can be precisely positioned.

Certain earthmoving machines have been equipped with sleeve metered fuel injection systems (see, for example, U.S. Pat. No. 3,385,221, assigned to the assignee of this application). Such fuel system greatly reduces the force necessary to change the fuel setting thereof by means of a governor control arrangement. In such a system, the associated governor control linkage does not include sufficient frictional force to maintain the governor from changing the fuel setting due to the vibrations of the machine. Consequently, the operator of the machine must constantly readjust the governor control lever to the desired speed setting. In machines equipped with the conventional scroll type fuel injection system, sufficient force is required to adjust the fuel setting thereof so that the system is not so subject to changes that would be caused from machine vibrations. As pointed out above, however, this is not the case with machines which have been equipped with sleeve metered fuel injection systems.

Various frictional devices for mounting a lever are of course known. (See, for example, U.S. Pat. No. 3,439,557 to Bookout and U.S. Pat. No. 3,477,308 to Wagstaff). While these frictional systems have been found to be effective for the purpose for which they were designed, it will be understood that it is always desirable to improve operating efficiency of the device, meanwhile keeping the device as simple in design as possible.

Of general interest in this area is U.S. Pat. No. 2,841,000 to Parks et al., assigned to the Assignee of this application.

SUMMARY OF THE INVENTION

It is an object of this invention to provide a frictional lever mounting which is capable of properly maintaining lever position when so desired.

It is a further object of this invention to provide a frictional lever mounting which, while fulfilling the above object, includes adjustment means for varying the frictional force applied to the lever, so that such frictional force may be chosen in accordance with any needs of the overall system.

It is a still further object of this invention to provide a frictional lever mounting which, while fulfilling the above objects, is extremely simple in design and manufacture.

The invention herein comprises a lever mounting comprising first end member means, and a shaft secured relative to the first end member means and extending therefrom. A lever arm has a base portion defining an aperture through which the shaft is disposed, the lever arm being pivotable about the longitudinal axis of the shaft. Friction material means are disposed between the base portion and the first end member means, and second end member means define an aperture through which the shaft is disposed, the second end member means being positioned on the side of the base portion opposite the first end member means, the second end member means being movable along the longitudinal axis of the shaft relative thereto. Friction material means are disposed between the base portion and the second end member means. Means are included for retaining the second end member means on the shaft.

BRIEF DESCRIPTION OF THE DRAWINGS

These and other objects of the invention will become apparent from a study of the following specification and drawings, in which:

FIG. 1 is a side elevation of a lever in combination with the inventive frictional mounting device;

FIG. 2 is a sectional view taken along the line II—II of FIG. 1; and

FIG. 3 is a sectonal view taken along the line III—III of FIG. 2.

DESCRIPTION OF THE PREFERRED EMBODIMENT

In FIG. 1 is shown a governor control lever arm 10 mounted on a structure 12 which makes a part of an operator seat assembly (not shown). The lever 10 is connected to a governor control linkage 14.

An end member 16 is secured to a plate 18 of structure 12 by means of capscrews 20. A shaft 22 is fixed to end member 16 by means of a roll pin 24, and extends from the end member 16, with its opposite end positioned by a block 26 secured to a plate 28 as by welding. The lever arm 10 has a base portion 30 which defines an aperture 32 through which the shaft 22 is disposed. The lever arm 10 is pivotable about the longitudinal axis of the shaft 22, being mounted thereon by needle bearings 34. A washer 36 and an annular friction disc 38 define apertures through which the shaft 22 is disposed, such washer 36 and friction disc 38 being disposed between the end member 16 and base portion 30.

The shaft 22 has a necked-down portion 40. Second end member means in the form of washers 42,44 define apertures 46,48 through which the shaft necked-down portion 40 is disposed. The washers 42,44 are positioned on the side of the base portion 30 opposite the end member 16, and are movable along the longitudinal axis of the shaft 22. Necked-down portion 40 of the shaft 22 defines flats 50 (FIG. 3) machined thereon, and the apertures 46,48 of washers 42,44 are shaped to cooperate with such flats 50 so that the washers 42,44 are secured from rotation relative to the shaft 22 about the longitudinal axis thereof.

Three annular friction discs 52,54,56 define apertures through which the necked-down portion 40 of the shaft 22 is disposed. A washer 58 defines an aperture 60 through which necked-down portion 40 is disposed, and a washer 62 defines an aperture 64 through which necked-down portion 40 is disposed. The friction discs 52,54,56 are mounted between the end member means 42,44 and the base portion 30, with the washer 58 between friction discs 52,54, and the washer 62 between friction discs 54,56. Each of the friction discs 52,54,56 and washers 58,62 is movable along the longitudinal axis of the shaft 22. The aperture 64 of washer 62 is shaped to cooperate with the flats 50 of necked-down portion 40 so that such washer 62 is secured from rotation relative to the shaft 22 about the longitudinal axis thereof. The other washer 53 has a tang member 66 extending therefrom which connects to the base portion 30, so that the washer 58 rotates with the base portion 30 about the longitudinal axis of the shaft 22.

The washers 42, 44 and other associated structure are positioned on the shaft 22 by a Belleville spring pack 68, protected by a retainer 70. A washer 72 is disposed over the retainer 70, and an adjusting nut 74 is threadably associated with the shaft 22 to be rotatable thereabout to move along the shaft 22, the spring pack 68 being disposed between the nut 74 and washer 42 to urge the washer 42 toward the end member 16.

Through the manner of the placement of the friction discs and associated washers, a sizable friction force may be achieved with a relatively compact arrangement. The actual friction force desired may be variably set by the adjustment of nut 74, which varies the amount of spring force developed in the spring pack 68. The overall design of the clutch assembly, it will be seen, is quite small, so that it may be easily fitted into an existing space. Such system is easily adjustable to provide the proper amount of frictional torque, depending on the application of the system. It will also be seen that the device may be preassembled before installation.

What is claimed is:

1. A lever mounting apparatus comprising first end member means, a shaft secured relative to the first end member means and extending therefrom, a lever arm having a base portion defining an aperture through which the shaft is disposed, needle bearing means disposed between the base portion and shaft, the lever arm being pivotable about the longitudinal axis of the shaft on said needle bearing means, friction material means disposed between said base portion and first end member means, second end member means defining an aperture through which the shaft is disposed and positioned on the side of the base portion opposite the first end member means, the second end member means being movable along the longitudinal axis of the shaft relative thereto, wherein the second end member means are secured from rotation relative to the shaft about the longitudinal axis of the shaft, friction material means disposed between the base portion and second end member means, means for retaining said second end member means on said shaft, wherein the friction material means disposed between the base portion and second end member means comprise first, second and third friction discs, each mounted on the shaft to be movable along the longitudinal axis of the shaft, and further comprising a first washer mounted on said shaft between the first and second friction discs, and movable along the longitudinal axis of the shaft, and a second washer mounted on said shaft between the second and third friction discs, and movable along the longitudinal axis of the shaft, the first friction disc being in contact with the base portion, the third friction disc being in contact with the second end member means, wherein the second washer is connected with the base portion for rotation therewith about the longitudinal axis of the shaft, and wherein the first washer is secured from rotation relative to the shaft about the longitudinal axis of the shaft.

* * * * *